United States Patent [19]

Schlaegel

[11] Patent Number: 4,796,376
[45] Date of Patent: Jan. 10, 1989

[54] FISHING DEVICE

[76] Inventor: Gene A. Schlaegel, 1810 Winston Dr., Iowa City, Iowa 52240

[21] Appl. No.: 90,087

[22] Filed: Aug. 24, 1987

[51] Int. Cl.[4] .............................................. A01K 85/00
[52] U.S. Cl. ................................... 43/42.29; 43/41; 43/44.6
[58] Field of Search ............... 43/42.29, 41, 41.2, 43/44.2, 44.6

[56] References Cited

U.S. PATENT DOCUMENTS

| | | | |
|---|---|---|---|
| 2,010,598 | 8/1935 | Leighton | 43/40 |
| 2,157,333 | 5/1939 | Hadaway | 43/40 |
| 2,582,646 | 1/1952 | Moore | 43/41 |
| 2,754,613 | 7/1956 | Rogers | 43/44.6 |
| 2,894,351 | 7/1959 | Doane | 43/44.6 |
| 2,940,208 | 6/1960 | Oswald | 43/44.6 |
| 2,984,929 | 5/1961 | Kwisnek | 43/44.6 |
| 3,293,790 | 12/1966 | Konomos | 43/44.2 |
| 3,457,666 | 7/1969 | Klinkhamer | 43/41 |
| 3,645,031 | 2/1972 | Egles | 43/44.2 |
| 4,067,135 | 1/1978 | Martin | 43/43.14 |
| 4,126,956 | 11/1978 | Bayer | 43/4.5 |
| 4,189,860 | 2/1980 | Ebert | 43/42.29 |
| 4,233,771 | 11/1980 | Robinson | 41/41 |

Primary Examiner—Kurt Rowan
Attorney, Agent, or Firm—Morton S. Adler

[57] ABSTRACT

A fishing device useful for casting and trolling includes an elongated buoyant plug type artificial fishing lure mounted to a bait harness adapted to hold a fish bait, filet or strip of fish bait. The harness is mounted longitudinally to the underside of the lure and includes opposed jaw members pivotally connected at one end under spring tension and provided with opposed spaced prongs at the opposite end. The jaws are normally closed with the prongs in overlapping position. An elongated flexible bar disposed in longitudinal alignment to the underside of the lure has a free end extending intermediate the closed prongs and is pivotally secured at the opposite end intermediate the jaws. When the jaws are opened, the rod is swingable on its pivot point to be perpendicular to the lure to facilitate its being impaled or skewered lengthwise through the fish bait from the head to protrude from the tail thereof. The rod with skewered fish bait is returned to longitudinal alignment with the lure and the jaws are returned to closed position where the prongs penetrate the fish bait to hold it securely against the underside of the lure. The closed prongs embrace the bar so that the bar and fish bait are maintained against lateral displacement relative to longitudinal alignment with the lure.

12 Claims, 2 Drawing Sheets

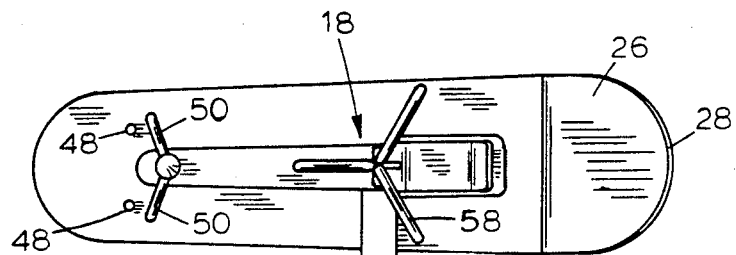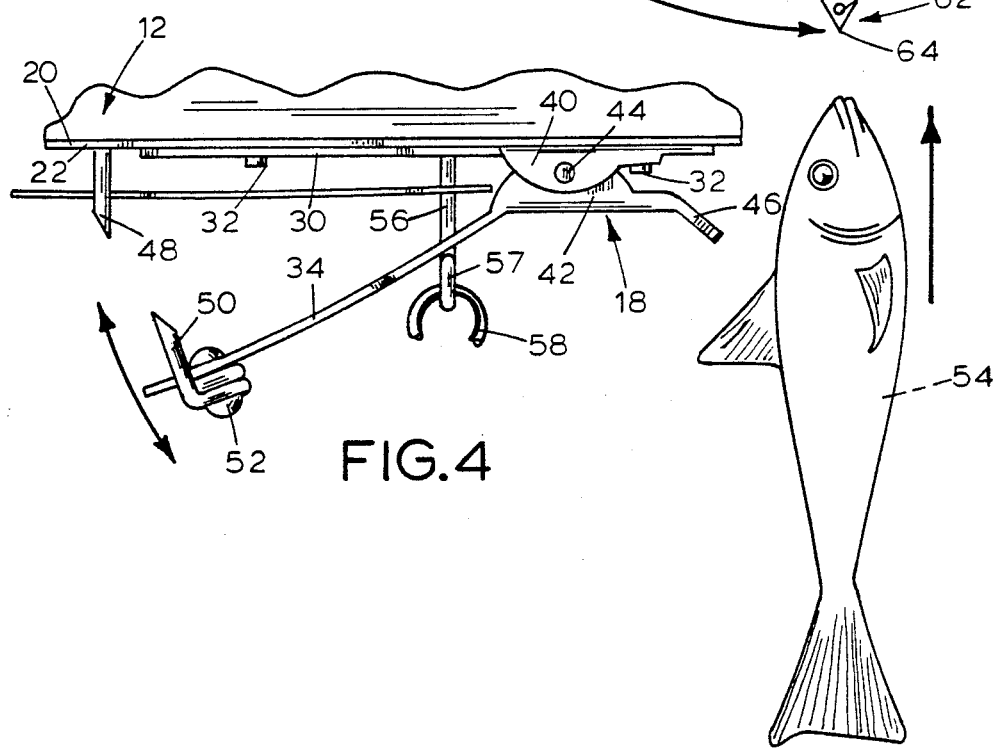

FISHING DEVICE

BACKGROUND OF THE INVENTION

This invention relates to improvements in fishing devices and more particularly to the novel arrangement of a plug type artificial fishing lure provided with a harness for holding a fish bait.

In the sport of fishing, the bait is generally either in the form of well known artificial lures fabricated in various forms and shapes such as plugs, spinners, flies and the like designed to simulate the natural action of what they represent or in some form of edible substance of which a popular form is a fish bait, live or dead, from small minnows to larger species as may be desired. For fish bait fishing, many forms of a bait harness have been devised and used which generally include some form of a blade or needle on which to impale the bait and which is secured to the fishing line. Examples of different forms of a fish bait harness are illustrated in U.S. Pat. Nos. 2,010,598, 2,157,333, 2,894,351, 4,067,135, 4,126,956 and 4,233,771. The use of fish bait as bait has the advantage of providing a scent for the prey and this feature is often enhanced by scent creating formulations which are commercially available and can be applied not only to the fish bait but to artificial lures, themselves, where scent is normally not present.

Disadvantages observed in the use of some forms of bait harness as presently used is that the bait is often dislodged by the predator fish or water friction and snags and that it is difficult to obtain desired action of the bait in trolling, casting and deep and shallow fishing.

With the above observations in mind, it is one of the important objects of this invention to provide a new and improved fishing device in the form of a plug type artificial fishing lure normally capable of use independently as bait but in accordance with the present invention is mounted to a jaws type fish bait harness.

Another object herein is to provide a fishing device of the above class wherein the fish bait harness includes movable jaws with bait penetrating prongs to securely hold the fish bait when casting or trolling.

A further object is to provide a fishing device as characterized that includes a bar upon which the fish bait is impaled or skewered that is easily and quickly movable to a position perpendicular to the plug type lure so as to be free and clear to facilitate the impaling of the bait.

Still another object is to provide a device of the above type where the impaling bar is bendable to an arcuate shape to produce a desired side to side action of the bait in simulating the natural action of a fish bait.

A further object is provide a fishing device as characterized in which the plug type lure is buoyant and serves to keep the fish bait in an appropriate position to perform in a natural manner.

Still another object herein is to provide an improved fishing device including a relatively flat bottomed artificial plug lure to which there is mounted a fish bait harness adapted to impale the fish bait and securely hold it with its side flat against the bottom of the plug so as to offer less resistance when pulled through the water and thus facilitate the side to side action of the plug and fish bait.

Another object is to provide an improved fishing device in the form of a plug type artificial lure mounted to a fish bait harness for securing a whole bait fish or a filet or strip of bait fish whereby the plug is provided with the element of a scent.

SUMMARY

In accordance with the present invention, an elongated buoyant plug type artificial fishing lure is mounted to a bait harness adapted to hold a fish bait, filet or strip of fish bait. The harness is mounted longitudinally to the underside of the lure and includes opposed jaw members pivotally connected at one end under spring tension and provided with opposed spaced prongs at the opposite end. The jaws are normally closed with the prongs in overlapping position. An elongated flexible bar disposed in longitudinal alignment to the underside of the lure has a free end extending intermediate the closed prongs and is pivotally secured at the opposite end intermediate the jaws. When the jaws are opened, the rod is swingable on its pivot point to be perpendicular to the lure to facilitate its being impaled or skewered lengthwise through the fish bait from the head to protrude from the tail thereof. The rod with skewered fish bait is returned to longitudinal alignment with the lure and the jaws are returned to closed position where the prongs penetrate the fish bait to hold it securely against the underside of the lure. The closed prongs embrace the bar so that the bar and the fish bait are maintained against lateral displacement relative to the longitudinal alignment with the lure. The lure keeps the fish bait positioned so it has a side to side action simulating a natural action of the bait and, preferably, the lure is provided with a well known lip on its leading end for directing it under water. The bar is bendable to bend the tail of the fish bait downwardly to cause the lure to dig deeper with more side to side action.

The foregoing objects and such further objects as may appear herein, or be hereinafter pointed out, together with the advantages of this invention will be more fully discussed and developed in the more detailed description of the accompanying drawings.

DESCRIPTION OF THE DRAWINGS

FIG. 4 is a fragmentary side elevational view of this invention illustrating the open position of the jaws forming a part of the bait harness, and FIG. 5 is a fragmentary bottom view of this invention to illustrate the movable position of the bait impaling bar and showing a fish bait to be impaled.

DESCRIPTION OF THE PREFERRED EMBODIMENTS

Figure 1:
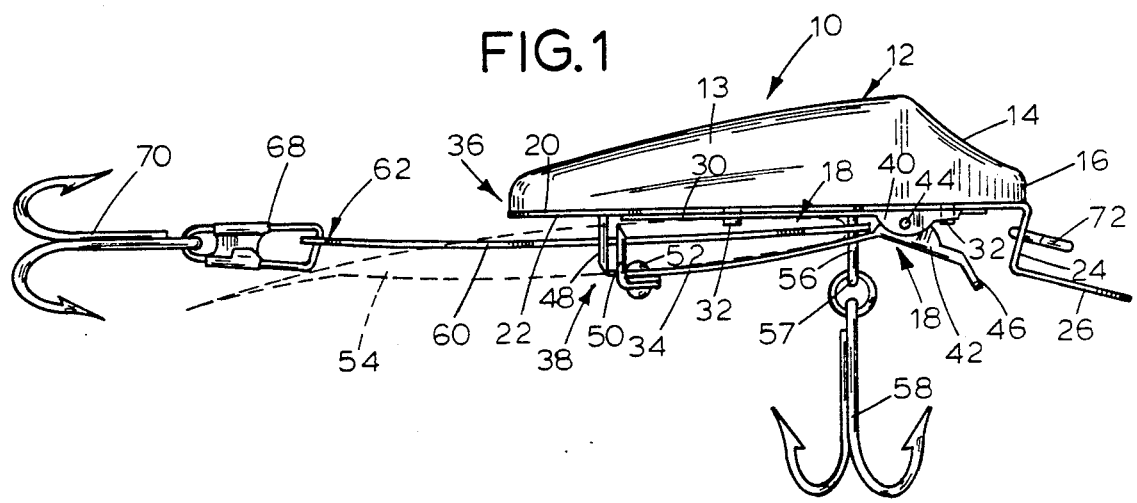
FIG. 1 is a side elevational view of a fishing device in the form of a fishing plug mounted to a fish bait harness according to this invention.

Referring to the drawings, this new fishing device designated by the numeral 10 includes a buoyant artificial plug type lure 12 of any desired configuration such as body 13 and, while not required, preferably is provided with a concave nose 14 at its leading end 16. Lure 12 may be in any form common to such devices normally capable of use independently as bait but in accordance with the present invention is mounted to a jaws type fish bait harness 18. By this arrangement, device 10 varies materially from prior harness devices identified earlier which, though sometimes identified as a lure, are in fact only a bait harness attached to a fishing line and do not include the feature of an independent lure in combination with a harness as a part of the overall device. Plug 12 is provided with a smooth or flat bottom 20, although this is not required, to which harness 18 is secured as follows.

A rigid plate 22 of any suitable material and conforming generally to the configuration of plug bottom 20 is preferably secured thereto by any suitable means for which I have preferably used a commercially available adhesive (not shown). Preferably, though not required for this invention, plate 22 at plug end 16 extends first downwardly as at 24 and then forwardly to form a lip 26 which is a well known feature on many artificial lures for directing them under water and for which no invention is claimed. Lip 26 is provided with an arcuate outer end 28.

Harness 18 includes an elongated fixed upper jaw 30 secured in longitudinal alignment with plate 22 by any suitable means such as rivets 32 and an opposed elongated movable lower jaw 34. The openable ends of jaws 30, 34 are oriented towards the trailing end 36 of plug 12 as at 38 (FIG. 1) and at their opposite ends, jaws 30, 34 are provided with nesting ears 40, 42 which are pivotally connected by a spring loaded pin 44 to normally hold said jaws in closed position and whereby the lower jaw 34 at end 38 can be moved away from jaw 30 by pressure on the lip or lever 46 extending from ear 42 on jaw 34.

Spaced depending fixed sharp pointed prongs 48 (FIGS. 1, 2, 5) are preferably mounted to plate 22 near end 38 of the upper jaw 30 but can also be made integral with such jaw end if desired and on end 38 of the lower jaw 34, there are spaced upstanding sharp pointed prongs 50 secured by a suitable fastening means 52 as best seen in FIG. 4. In this arrangement, prongs 48, 50 overlap each other in closed position as seen in FIG. 1 for securely holding the fish bait 54 as will later appear.

Figure 2:
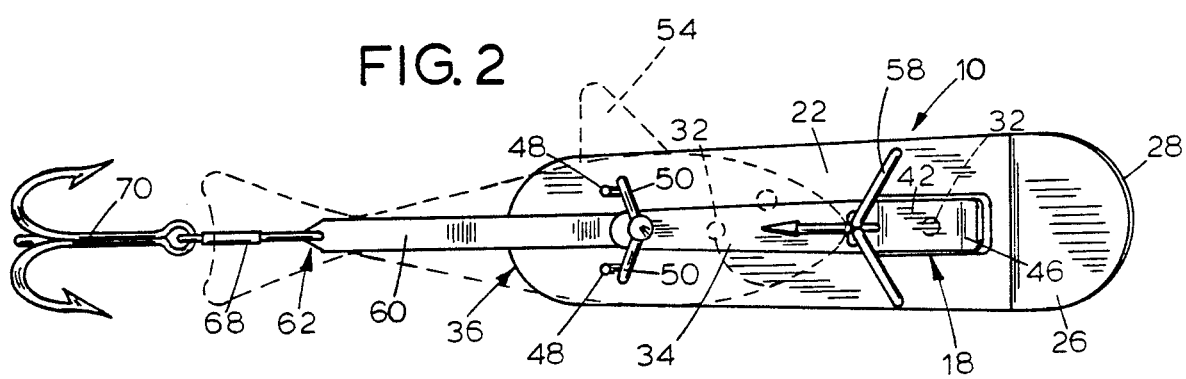
FIG. 2 is a bottom view of the device in FIG. 1 showing a fish bait in phantom secured to the harness.
Figure 3:
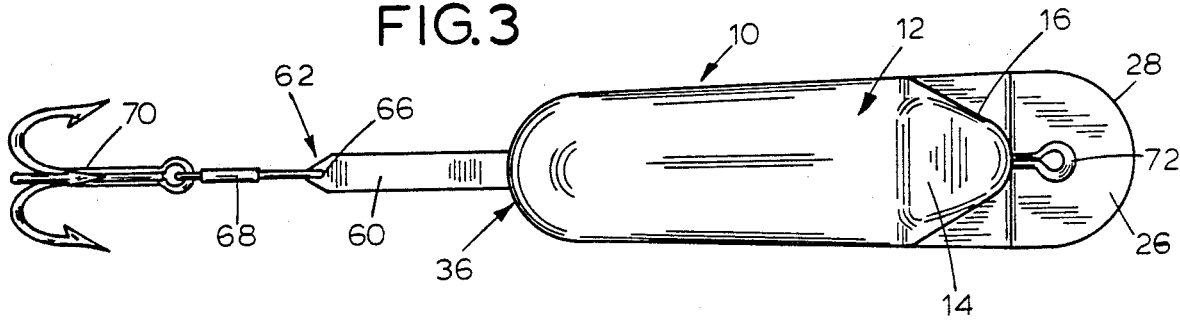
FIG. 3 is a top view of the device in FIG. 1.

A pin 56 is secured to and depends from plate 22 through jaws 30, 34 adjacent jaw ears 40, 42 (FIG. 1) and is provided with an eye 57 below jaw 34 to carry any selected form of a fish hook 58. An elongated flexible bar or rod 60 has a free end 62, preferably sharpened as at 64, provided with a hole 66 and at its opposite end is pivotally attached to pin 56 intermediate jaws 30, 34 (FIGS. 1, 4). In the closed position of jaws 30, 34 (FIG. 1), bar 60 is disposed in longitudinal alignment with plug 12 and extends intermediate prongs 48, 50 which serve to hold bar 60 against lateral displacement from such alignment. In the open position of jaws 20, 34, bar 60 is swingable on its pivot connection to pin 56 to a position perpendicular to plug 12 as best seen in FIG. 5 where it is free and clear for handling to facilitate its being impaled or skewered through a fish bait 54 from the mouth thereof to exit at the tail (FIG. 2). With the impaled or skewered bait, bar 60 is returned to longitudinal alignment and in juxtaposition with plug 12 and when the jaws 30, 34 are closed, prongs 48, 50 will penetrate the bait 54 to secure it to plug 12 for casting and trolling and hold it against being pulled loose by the predator fish, water friction or snags. Bar 60 is bendable to adjust the position of bait 54 and particularly to incline the tail downwardly causing the lure to dig deeper with more side to side action. On bar end 62 protruding from the tail of the bait 54, a suitable clip 68 carrying another fish hook 70 is removably attached to bar end 62 through hole 66. It will be understood that the size and length of lure 10 may be varied without change in its construction according to the size of the predator fish and that additional fish hooks may be imposed intermediate hooks 58, 70 if deemed desirable. An eye hook 72 on portion 24 of lip 26 is provided to receive a fishing line (not shown). The buoyancy of plug 12 serves to support and maintain the fish bait 54 in a position resulting in a natural side to side action thereof.

When impaling bar 60 through the fish bait 54, it is recommended that bait 54 be on its side (FIG. 5) relative to longitudinal alignment with bar 60 so that when such bar with the impaled bait is returned to longitudinal alignment with plug 12, the side of bait 54 will be flush against the bottom 20 of the plug 12 and securely held in this position when jaw 34 is closed. With this arrangement, bait 54 offers less resistance in the water and increases the side to side action which is desired. The effectiveness of securing the side of bait 54 to plug 12 will be enhanced if bottom 20 is smooth or flat as suggested earlier and I preferably use a plug 12 in such form. The results of using this device in this manner have been most satisfactory and appear to be an advantage over fish bait harnesses presently in use which generally secure the fish bait in an upright position. It will be understood, however, that while securing the side of the fish bait to a flat bottomed plug has produced satisfactory results, this is not required for the effective use of this invention. Accordingly, in view of the foregoing, it is thought a full understanding of the construction and operation of this invention will be had and the advantages of the same will be appreciated.

I claim:

1. A fishing device, comprising:
a plug type artificial fishing lure,
a fish bait harness secured to said lure and adapted to securely hold a fish bait in juxtaposition therewith,
said harness including spring-loaded openable and closable jaws having bait penetrating overlapping prongs for engaging a fish bait,
an elongated bar upon which a fish bait is impaled or skewered carried by said harness,
the prongs on said jaws when in closed position embracing said bar to hold said bar with fish bait against lateral movement relative to said lure, and
a fish hook depending from said harness.

2. A fishing device as defined in claim 1 including said lure being of a configuration capable of use independently as a bait.

3. A fishing device as defined in claim 1 including said bar being pivotally secured at one end to said harness whereby with said jaws open said bar is swingable to a position perpendicular to said lure to facilitate impaling a fish bait.

4. A fishing device as defined in claim 1 including said lure being provided with a bottom surface and said harness adapted to secure a fish bait in juxtaposition to said bottom surface.

5. A fishing device as defined in claim 4 wherein said bottom surface is flat.

6. A fishing device as defined in claim 1 wherein said lure is buoyant to hold a fish bait in position to effect a natural side to side action during trolling.

7. A fishing device, comprising:
an elongated plug type artificial fishing lure defining a body with a bottom surface,
a fixed upper jaw secured to said bottom surface in longitudinal alignment with said lure,
a movable lower jaw complementary to said upper jaw and with corresponding opposed ends, means pivotally connecting said jaws under spring tension at one opposed ends to normally hold the opposite opposed ends in closed position, means on said lower jaw to selectively move it to open position, means on said opposite opposed ends for securely holding a fish bait, a fish hook secured to and depending from said lure, an elongated bar having a free end with its opposite end pivotally mounted to said harness intermediate said jaws and adapted to be disposed in longitudinal alignment with said lure, in open position of said jaws said bar being movable on its pivot connection to a position perpendicular to said lure for the purpose of being skewered lengthwise through a fish bait from the head thereof so its free end protrudes from the tail of the bait, and with said bar and fish bait returned to longitudinal alignment with said lure the closing of said jaws secures said fish bait in juxtaposition to said lure.

8. A fishing device as defined in claim 7 wherein said bottom surface is flat.

9. A fishing device as defined in claim 7 wherein said lure is buoyant to hold a fish bait in position to effect a natural side to side action during trolling.

10. A fishing device, comprising:

an elongated plug type artificial fishing lure defining a body with a bottom surface, a fixed upper jaw secured to said bottom surface in longitudinal alignment with said lure, a movable lower jaw complementary to said upper jaw and with corresponding opposed ends, means pivotally connecting said jaws under spring tension at one opposed ends to normally hold the opposite opposed ends in closed position, means on said lower jaw to selectively move it to open position, spaced prongs on said opposite opposed ends for securely holding a fish bait, a fish hook secured to and depending from said lure, a pin secured to and depending from said bottom surface through said jaws at said one opposed ends, an eye on the free end of said pin to receive a fish hook, an elongated bar having a free end provided with a hole and the opposite end pivotally journalled on said pin intermediate said jaws, said bar adapted in the closed position of said jaws to be disposed in longitudinal alignment with said lure so said free end extends intermediate said prongs, in the open position of said jaws said bar being movable on its pivot connection to said pin to a position perpendicular to said lure for the purpose of being skewered lengthwise through a fish bait from the head thereof so its free end protrudes from the tail of the bait, with said bar and fish bait returned to longitudinal alignment with said lure the closing of said jaws secures said fish bait in juxtaposition to said lure with said prongs embracing said elongated bar to hold the same with bait against lateral movement relative to said lure, and a fish hook removably secured through the hole in the free end of said elongated bar.

11. A fishing device as defined in claim 10 wherein said bottom surface is flat.

12. A fishing device as defined in claim 10 wherein said lure is buoyant to hold a fish bait in position to effect a natural side to side action during trolling.

* * * * *